(No Model.) 5 Sheets—Sheet 2.
E. B. PARKHURST.
DYNAMO ELECTRIC MACHINE OR ELECTRIC MOTOR.
No. 422,148. Patented Feb. 25, 1890.
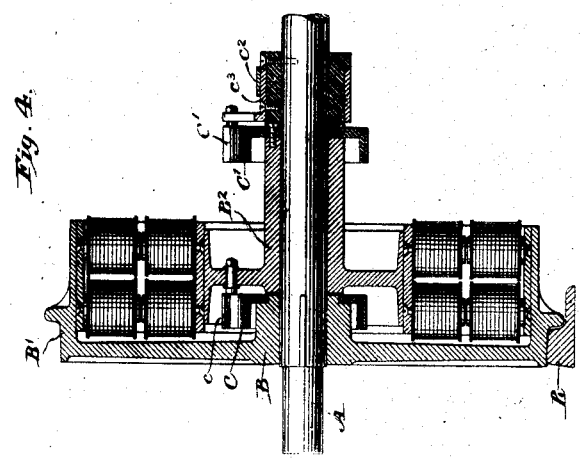
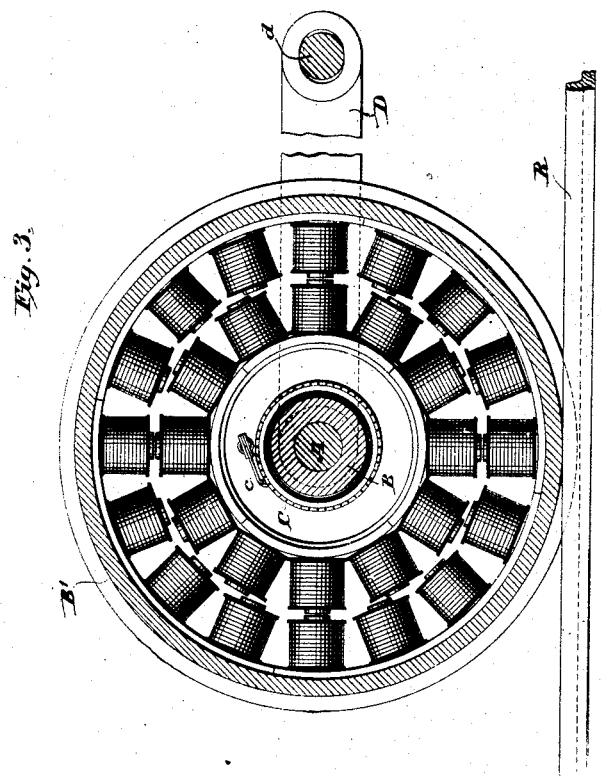
Witnesses
Geo. W. Breck.
Edward Thorpe.
Inventor
Edward B. Parkhurst.
By his Attorneys
Baldwin Davidson & Wight

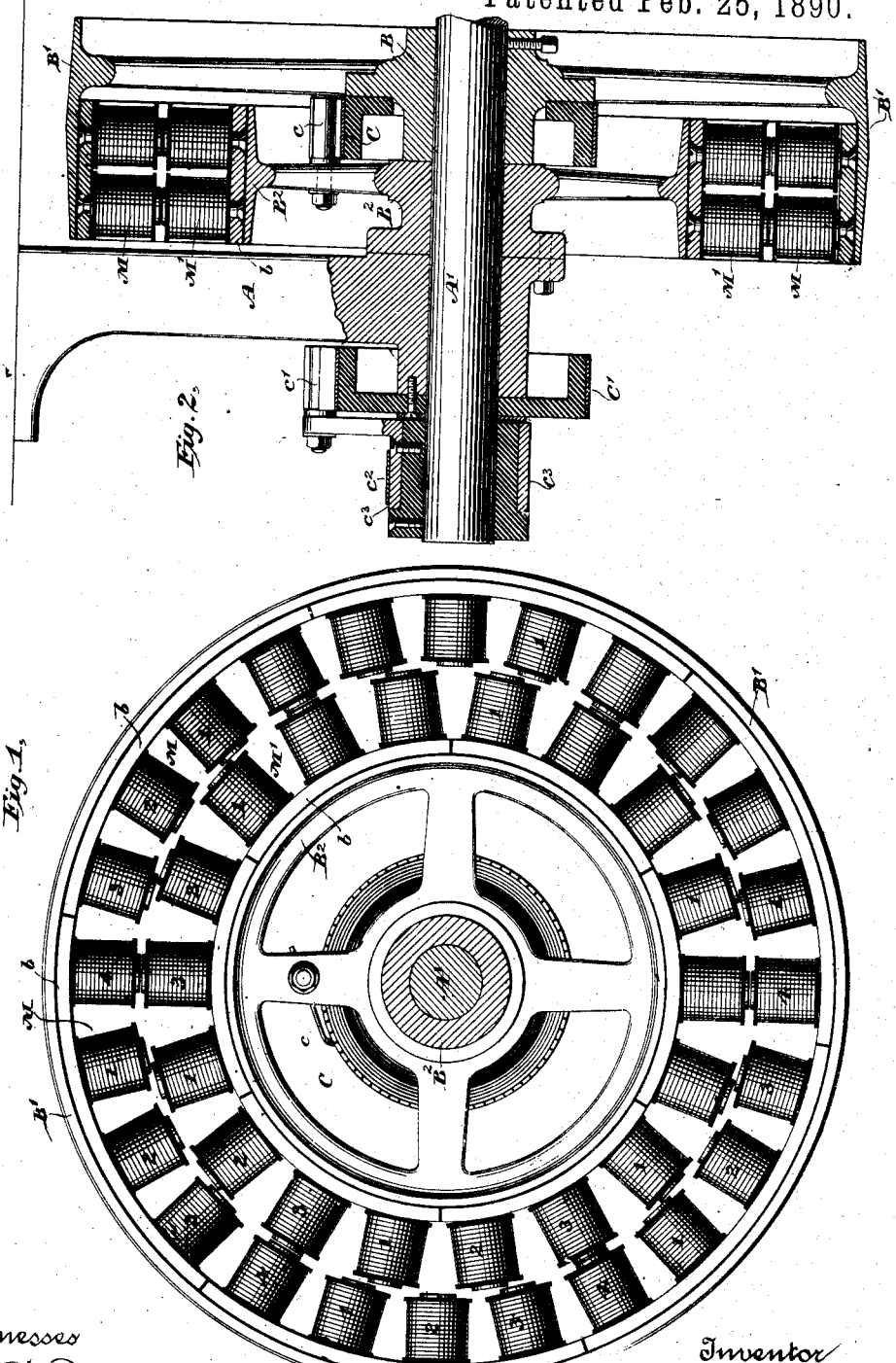

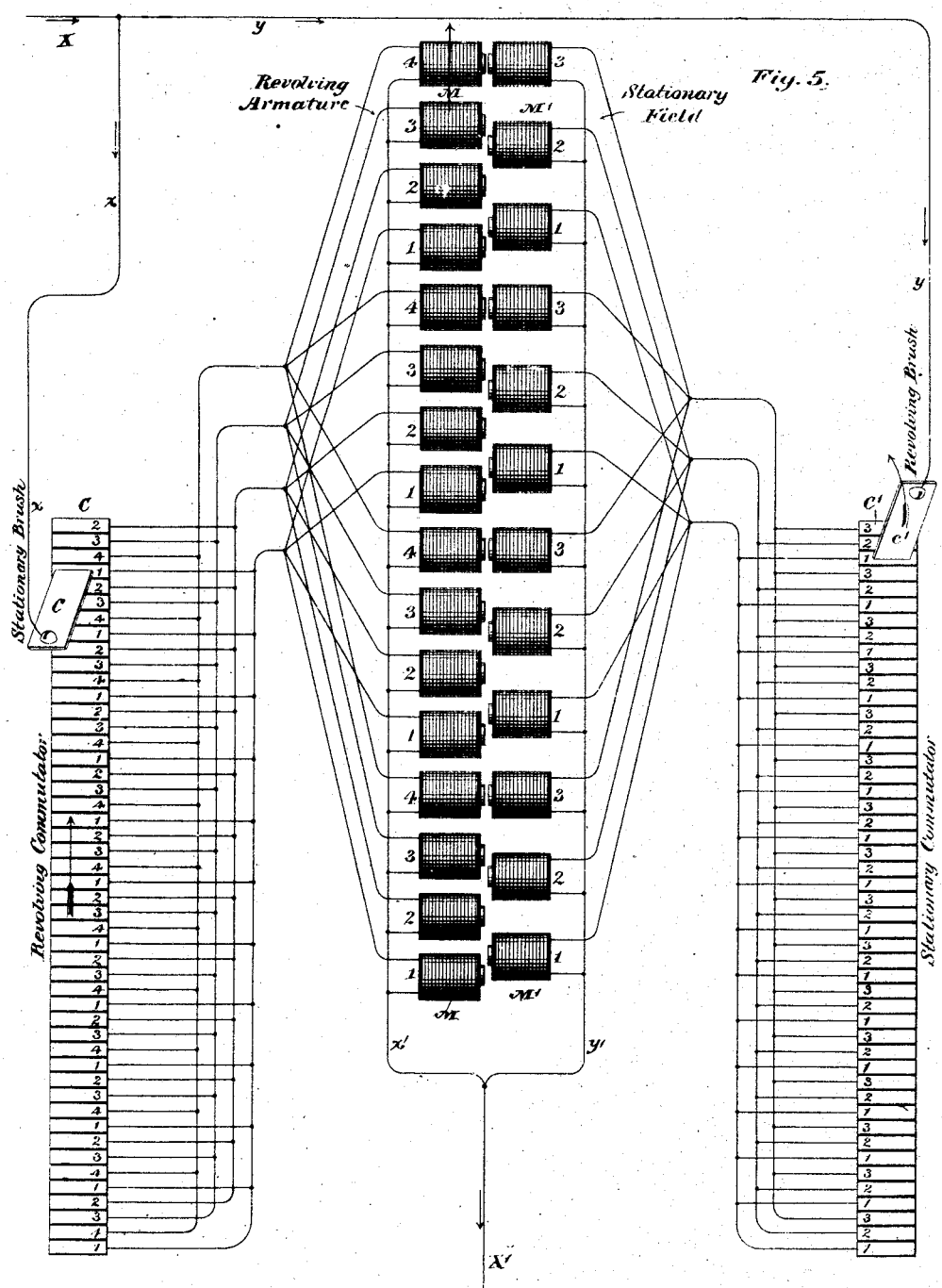

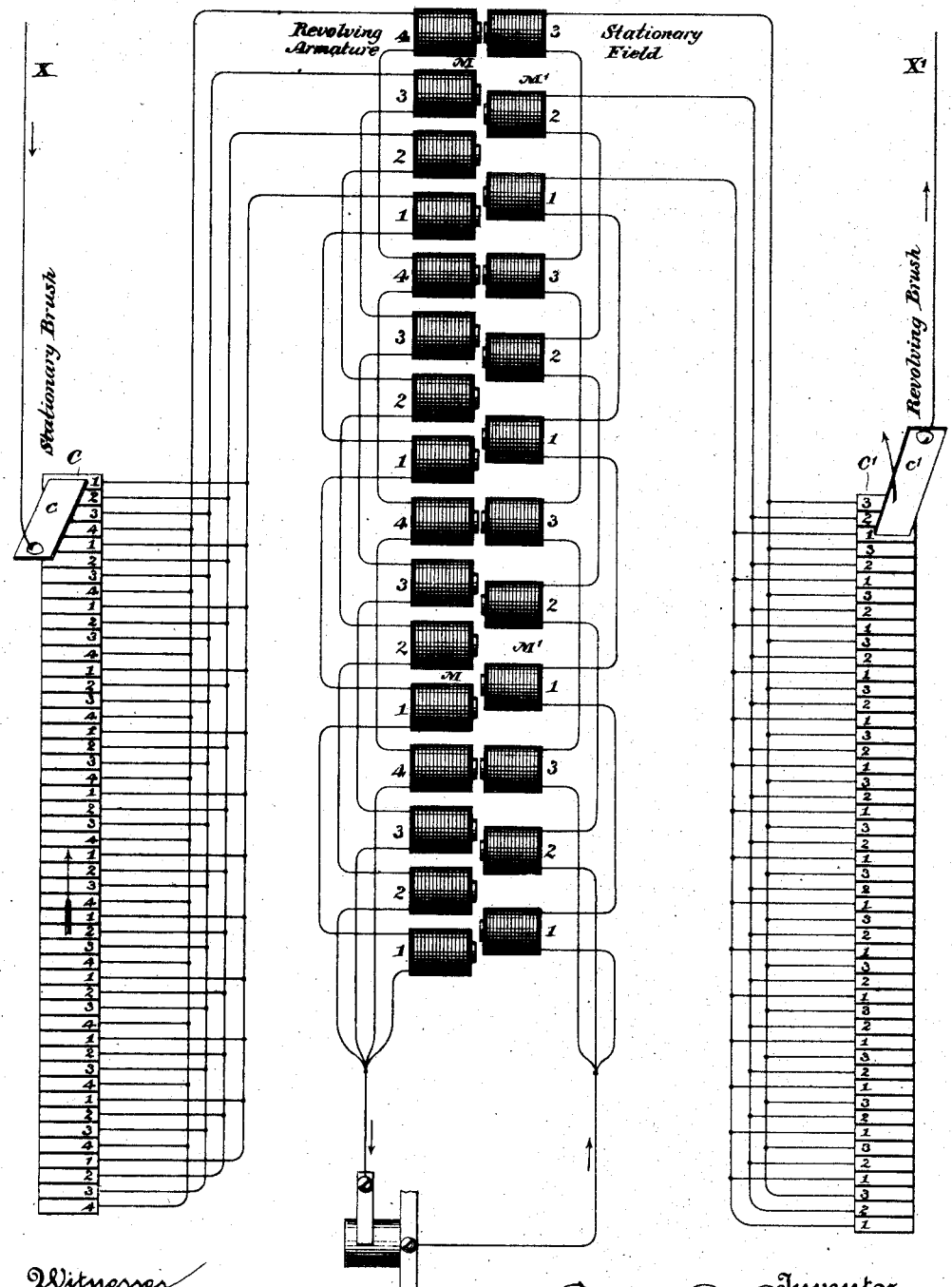

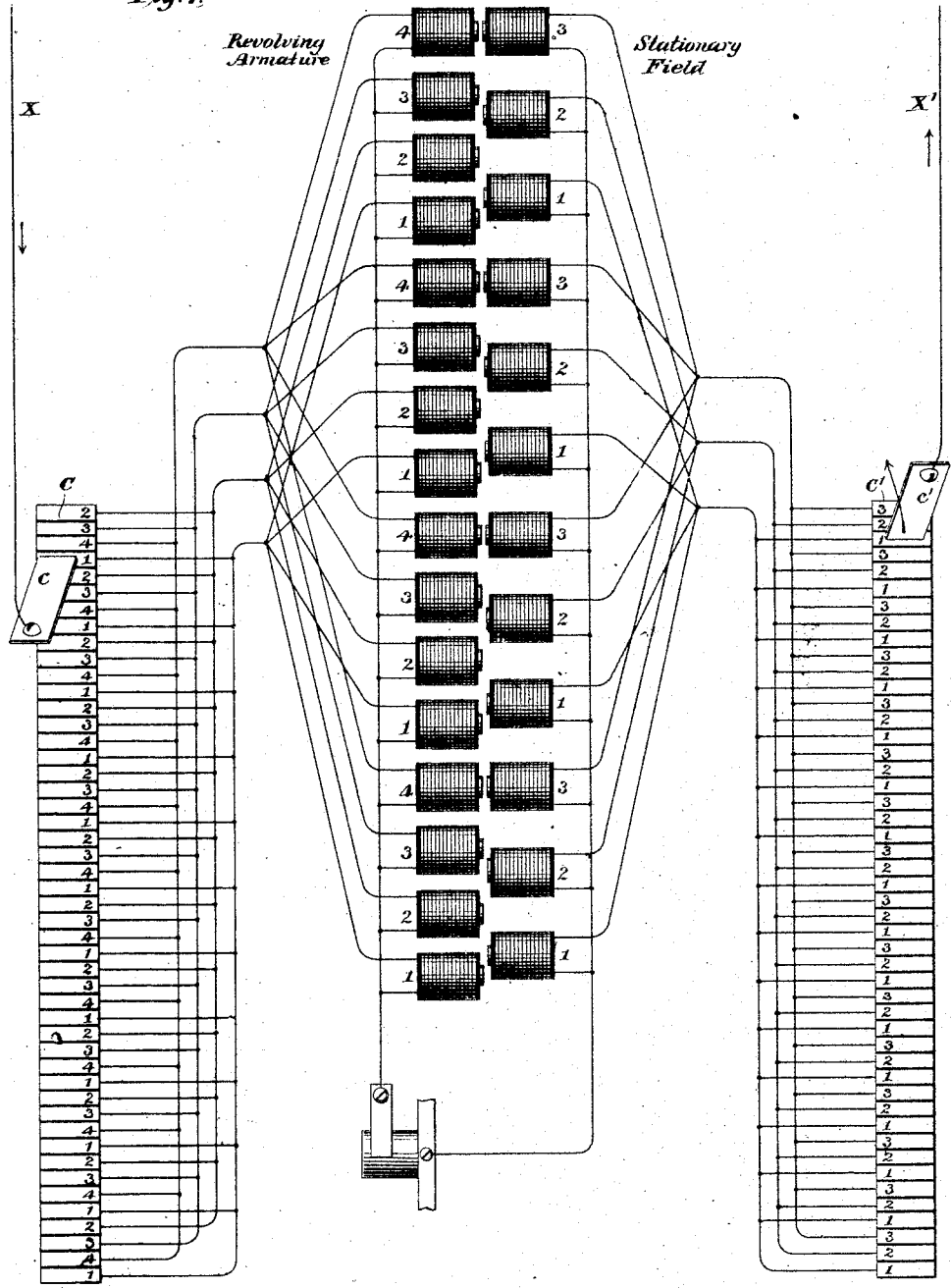

UNITED STATES PATENT OFFICE.

EDWARD B. PARKHURST, OF WOBURN, MASSACHUSETTS, ASSIGNOR TO THE FLORENCE MOTOR COMPANY, OF MAINE.

DYNAMO-ELECTRIC MACHINE OR ELECTRIC MOTOR.

SPECIFICATION forming part of Letters Patent No. 422,148, dated February 25, 1890.

Application filed August 14, 1889, Serial No. 320,699. (No model.)

*To all whom it may concern:*

Be it known that I, EDWARD B. PARKHURST, a citizen of the United States, and a resident of Woburn, Middlesex county, in the State of Massachusetts, have invented certain new and useful Improvements in Dynamo-Electric Machines or Electric Motors, of which the following is a specification.

My invention relates to that class of electric dynamos, generators, or motors having field and armature magnets arranged radially around a central axis. Such single magnets have been in one case so arranged in series as to cause two of the field-magnets to act simultaneously on an armature—one with an attracting and the other with a repelling force—so as to secure their co-operation, which was a very good arrangement, so far as it went, but limited in scope. In another instance several series of single magnets have been arranged end to end in series around a common shaft and parallel therewith, so that one armature of each set acted simultaneously on the corresponding field-magnets once during each revolution. Such an arrangement involves a long shaft, complicated apparatus, and occupies a large space.

The objects of my invention are to increase the efficiency and uniformity of the application of the power of such a machine in such manner that its maximum power will constantly be exerted at all points around the shaft, while securing a compact machine, to which end my improvement comprises in general outline a double series of multiple field and armature magnets circumferentially and concentrically arranged, so that either or both series may revolve around a common axis, each series of magnets being arranged in corresponding groups, so that the several groups of field-magnets simultaneously and successively act upon their respective groups of armatures so as to exert the greatest effect. Each group of field-magnets acts successively on each group of the entire series of groups of armature-magnets during each revolution; or, in other words, each armature-group acts several times in each revolution, and, except at such times as the commutator-brushes bridge from one bar to another during the time one group or set of magnets is acting, all the other armature-magnets are out of action. By such an organization I am enabled to utilize the full power of the current to the greatest advantage by causing it to energize at one time those magnets or coils only which sustain the most favorable relation to each other, the groups of magnets in field and armature being successively thrown into action as they come into the most advantageous position. The magnets of each of the several groups are located at equidistant points in the series of armature and field poles, so that torsion and unequal strain on the armature or frame are avoided. All the coils or magnets in the field successively pass in front of all the armature-coils—that is to say, the field and armature coils are in two concentric series and all the movable coils are revolved in front of all the stationary coils, or both might revolve, as is well understood.

In this case the invention is shown applied to pulley-wheels and traveling vehicle or car wheels, the rim of the wheel in each case constituting part of the revolving or moving frame of the motor. The arrangement of electric motor and traveling or traction wheel and pulley is, however, not my invention and is not claimed by me.

In the accompanying drawings, Figure 1 is a side elevation of a motor-pulley, the rotating magnets projecting radially inwardly from the rim of the pulley and the stationary magnets projecting outwardly from the fixed center or hub; Fig. 2, a vertical longitudinal section illustrating the same matter; Fig. 3, a view partly in elevation and partly in section, showing the invention applied to a car or other traction wheel; Fig. 4, a vertical longitudinal section showing the same matter. Fig. 5 is a diagram view showing circuit-connections, and Figs. 6 and 7 similar diagrams showing other ways of connecting the motor in circuit.

For convenience the specific structures shown will first be described.

Referring to Figs. 1 and 2, A indicates a pulley-hanger, and A' the shafting. B is the hub revolving with the shaft and carrying the pulley-rim B'. The revolving magnets M, which may be called the "armature-magnets," are here shown as double-pole or horseshoe magnets, the poles of each magnet being arranged transversely to the pulley-rim. They are carried upon magnetically-insulated iron sector-plates $b$, secured to the inner face of the rim of the pulley. Stationary or field magnets M' are mounted upon similar sector-plates secured upon the outer face of the stationary hub $B^2$. The revolving hub B has a commutator C, upon which a stationary brush $c$, carried by the fixed part $B^2$ of the pulley, bears. There is also a stationary commutator C', carried by some part of the structure—in this instance by the hanger—and a revolving brush $c'$, carried by the shaft, bears upon it. Current may be led to the latter brush by a rubber $c^2$, bearing upon the insulated ring $c^3$, that carries the brush-holder.

In Figs. 3 and 4 a similar construction is shown. In these figures, A represents a car-axle; B B', the revolving hub and rim or tread of a car-wheel running upon a rail R; $B^2$, the non-rotating hub mounted on the car-axle and held against rotation by an arm D, extending from it and embracing an adjoining axle $d$. The stationary and moving commutators and brushes are marked by the same letters as in Figs. 1 and 2.

These two constructions illustrate two purposes to which the invention may be applied. Where it is desired to apply the power of the motor in the ordinary way, the interior magnets or coils may be made to revolve while the outer ones remain stationary, and of course the power may be taken from either series of magnets by means of any suitable construction, and the field and armature magnets, instead of being arranged in the same plane, may be arranged in parallel planes, as indicated in Fig. 5, facing each other, as is common.

Diagram view Fig. 5 shows clearly the operation of the invention. The revolving or armature magnets or coils M are numbered consecutively 1, 2, 3, 4, in four series, sixteen magnets being shown. The metallic commutator-strips, forty-eight being shown, are similarly numbered, and all the magnets or coils of like number are connected with all the commutator-bars bearing the same number. The commutator C revolves with the armature, as indicated by the arrow, and the brush $c$ is stationary. There are twelve stationary field magnets or coils M', and these are consecutively numbered 1, 2, 3, in four series. The stationary commutator C' has forty-eight strips, which are correspondingly numbered, and all the magnets of like number are connected with all the correspondingly-numbered strips in the commutator. $c'$ is the revolving brush for this commutator. In this diagram the revolving and stationary coils are connected in parallel. The current enters at X, where the circuit divides into parallel branches. The branch $x$ includes the commutator-brush $c$, and the metallic strips of the commutator C the various revolving or armature coils in multiple and wire $x'$, leading to the conductor X'. The other branch $y$ includes the brush $c'$, and the metallic strips of the commutator C' the various stationary or field coils in multiple and wire $y'$ to the conductor X'. The coils or magnets in the revolving armature are greater in number than those in the field. Both commutator-brushes being upon strips numbered 1, the groups of coils 1 1 in field and armature, which are, as shown, in a more advantageous relation to each other than those bearing any of the other numbers, attract each other, the armature being rotated in the direction of the arrow. As the armature moves forward, the coils or magnets in the groups 1 1 approach each other, and the commutators transfer the circuits to the groups 2 2, preferably before the axes of the groups numbered 1 become coincident. The groups 2 2 will then have assumed about the relation that the groups 1 1 occupy in the drawings—that is, the groups 2 2 are now in a more advantageous position, and they alone are active. In like manner, as will be plain from the diagram, the groups 3 3 act, then group 4 in the revolving armature and group 1 in the field, then group 1 in the revolving armature and group 2 in the field, and so on continuously. Each group of coils is active when it is in a position with reference to another group to produce a maximum result or power, or nearly so, from the current employed, and each maximum result thus produced acts through a comparatively small portion of the revolution of the revolving armature.

The ends of the brushes may be cut on an angle, as is common, or be sufficiently wide, as shown, to bridge from strip to strip. As the commutator-brushes bridge from one strip to another, two groups of coils in each series will during that time be in circuit, and I prefer to arrange the time during which this takes place in the following manner: As the axes of the poles or coils of an active group approach closely a position in which they are each nearly coincident with the axis of an opposite active pole or coil, the power of attraction between them decreases, and at this time each brush bridges to the succeeding commutator-strip, throwing the next group of coils into action. The attraction between the coils of these latter groups is thus at the start and while they are more removed from each other supplemented by the pull between the preceding groups of coils, and as the second groups come into more effective proximity the first groups are cut entirely out. Thus a practically uniform pull equal, or nearly so, to the maximum effect the current is capable of producing is constantly applied to the driven part of the machine. This is the arrangement that I prefer. The brushes may, however, be so constructed that they will not bridge from one commutator-strip to its neighbor, but will at times rest solely upon the intervening insulation. There are no dead-points.

It will be seen that during each revolution the several groups of coils are repeatedly active.

I have devised means for stopping and reversing the direction of motion of this motor; but as that subject-matter forms no part of the invention claimed in this application I do not show or describe it here, but refer to a full description of the same in another application about to be filed by me.

Any suitable number of magnets or coils may be used in the field and armature, provided they are in such number and so arranged, substantially as described and shown, that they will operate in the manner described.

With this invention there is an application of power at a number of points nearly equidistant from each other around the center of rotation, and, the power of attraction being exerted at points relatively far distant from the center of motion as compared with ordinary forms of motors, a long leverage is obtained. Practically the motor gives its maximum power for all speeds, and I am enabled to apply its power direct and thus dispense with the ordinary reducing-gear.

In either the stationary or revolving series instead of coils I may employ unwound armatures, permanent magnets, or merely bars of iron in place of the electro-magnets hereinbefore described, and in that event but a single commutator and brush will be required.

Instead of connecting the coils of each group in multiple between their commutator-strips and the line X', they may of course be connected in series, substantially as shown in Figs. 6 and 7, and instead of connecting the revolving coils in multiple with the stationary coils, as in Fig. 7, they can be connected in series, substantially as shown in Fig. 6—that is, the coils of a revolving group connected either in series or multiple may be connected in series with the coils of a stationary group which are either in series or multiple. Such connections and the manner of making them will by reference to these figures be thoroughly understood by those skilled in the art, and specific description is unnecessary.

In Figs. 1, 2, 3, and 4 it has not been thought necessary to show the circuit-connections, since several ways of arranging them are clearly shown in Figs. 5, 6, and 7. In Figs. 1 and 2 one branch of the circuit may enter at the rubber $c^2$, the other at the stationary brush $c$, and both branches of the circuit $x\,y$, Fig. 5, after passing through their respective series of coils, may terminate in the frame of the pulley and thence out through the hanger. In Figs. 3 and 4 the current derived from an overhead conductor, or any other conductor, or a source of electric energy on the vehicle may enter at the rubber $c^2$ and at the brush $c$, thence through the commutators and series of coils to the revolving rim or frame of the wheel and non-rotary hub and out by the rail R or in any other manner. Such matters are merely questions of electrical engineering and capable of variation.

Having thus fully described the construction, organization, and operation of my improved electric motor, what I claim therein as new and of my own invention is—

1. The combination, substantially as hereinbefore set forth, of a series of groups of armature-magnets and a corresponding series of groups of field-magnets arranged concentrically and circumferentially around an axis, about which either or both revolve, with commutators and circuit-connections so organized that each movable group acts successively during a single revolution on each group of the opposite series, so as to develop and utilize the maximum efficiency of the apparatus.

2. The combination, substantially as hereinbefore set forth, of a series of groups of radial armature-magnets rotating in a common plane about a common axis and a corresponding series of groups of radial field-magnets concentrically and circumferentially arranged about the same axis, with commutators and circuit-connections by which each corresponding set of armature and field magnets are arranged in parallel, and so that each group of armatures acts successively in each revolution on every group of field-magnets.

3. The combination, substantially as hereinbefore set forth, of a series of symmetrical groups of armature-magnets and a corresponding series of smaller symmetrical groups of field-magnets, both arranged concentrically around a common axis, about which at least one set of magnets revolves past and co-operates with all the groups of the other set in succession during each rotation, with circuit-connections and commutators which so excite the corresponding magnets of each set as to produce the maximum working effect through each set of groups during the short successive periods of passing each other.

4. The combination, substantially as hereinbefore set forth, of a series of symmetrical groups of armature-magnets and a corresponding series of groups of field-magnets arranged concentrically around a common axis, about which at least one set of magnets revolves past and co-operates with all the groups of the other set in succession during each rotation, with circuit-connections and commutators, whereby each alternate group in each set is arranged in a separate series bridged by the commutators in such manner as to cause two successive sets of groups in each series to act with gradually varying force to exert a continuous pull on each armature during its entire revolution.

5. The combination, substantially as hereinbefore set forth, of a series of symmetrical groups of armature-magnets and a corresponding series of groups of field-magnets arranged concentrically in parallel planes, with their poles end to end, around a common axis, about which at least one set of magnets revolves past and co-operates successively with all the groups of the other set in each revolution, the groups of each set being arranged in alternate series and provided with circuit-connections, a divided commutator, and a brush bridging each set of commutators, so as to cause two successive sets of groups in each series to coact for a short period as their poles pass, with a continuous pull of gradually-varying strength to obtain the maximum efficiency of result.

In testimony whereof I have hereunto subscribed my name.

EDWARD B. PARKHURST.

Witnesses:
WM. A. MACLEOD,
ROBERT WALLACE.